3,337,518
POLYMERIZATION INITIATORS CONSISTING OF HALOGENATED SULFUR CONTAINING ORGANIC COMPOUNDS HAVING AT LEAST ONE S(O)$_n$ FUNCTIONAL GROUP
George E. Serniuk, Roselle, and Peter E. Wei and John Rehner, Jr., Westfield, N.J., assignors to Esso Research and Engineering Company, a corporation of Delaware
No Drawing. Filed Jan. 24, 1964, Ser. No. 339,884
20 Claims. (Cl. 260—87.3)

The present invention relates to a method for making polymers. More particularly, the invention concerns producing polymers of free-radical polymerizable monomers with halogenated sulfur-containing organic polymerization initiators.

Various methods have been proposed for the homopolymerization and copolymerization of ethylene, higher alpha olefins, and other free-radical polymerizable monomers that employ different types of polymerization initiators. Current commercial processes for the polymerization of free-radical polymerizable monomers such as ethylene, wherein peroxide initiators are employed, suffer from serious defects in that high conversions are not obtainable without making products of poor quality. When the usual peroxide catalyst initiators are employed, conversions exceeding from 10 to 15% are not generally attainable since cross-linking of the polymer product occurs at higher conversions.

Now, in accordance with this invention, it has been discovered that free-radical polymerizable monomers, i.e., olefins having ethylenic unsaturation, can be polymerized with certain halogenated sulfur-containing organic compounds having (1) at least one S(O)$_n$ function wherein n is an integer of 1 to 2 and (2) at least two essentially halogenated organic radicals attached to each function. The polymerization reaction is preferably conducted in the presence of an inert diluent at moderate temperatures and at pressures ranging from atmospheric to superatmospheric.

In one embodiment of the present invention, compounds that can be used to initiate the polymerization of monomers in accordance with the invention are those having the general formula:

wherein n is 0 or 1, and R and R' are perhalogenated hydrocarbon or perhalogenated oxyhydrocarbon groups containing 1 to 20 carbon atoms. While the perhalogenated moieties can be alkyl, alkoxy, cycloalkyl, alkaryl, aryl, aroxy, alkyl sulfenyl or aryl sulfenyl groups, it is preferred to use compounds containing perhalogenated lower alkyl groups such as trichloromethyl and pentachloroethyl.

In another embodiment of the present invention, compounds having more than one sulfur group per molecule that can be used to initiate polymerization in accordance with the invention are those having the general formula:

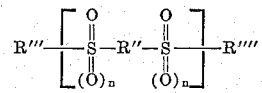

wherein n is 0 or 1, and R″, R‴, and R″″ are halogenated moieties corresponding to the moieties of the R and R′ described above.

Representative non-limiting examples of useful halogenated organic sulfonyl and sulfenyl compounds including compounds not represented by the above formulas that can be used alone or in combination to carry out the invention are bis(tribromomethyl)sulfone,
bis(tribromomethyl)sulfoxide,
bis(trichloromethyl)sulfoxide,
pentachloroethyltrichloromethylsulfoxide,
trichloromethyldichloromethylsulfoxide,
bis(trichloromethyl)sulfone,
pentachloroethyltrichloromethylsulfone,
trichloromethyldichloromethylsulfone,
1,1,1-trichloro-2,2,2-tris(trichloromethylsulfenyl)ethane,
1,1,1-trichloro-2,2,2-tris(trichloromethylsulfonyl)ethane,
1,1,1,3,3,3-hexachloro-2,2-bis(trichloromethylsulfenyl)propane,
1,1,1,3,3,3-hexachloro-2,2-bis(trichloromethylsulfonyl)propane,
trichloromethyltrichloromethylsulfinate,
trichloromethyl trichloromethyl sulfonate,
bis(trichloromethyl)alpha-disulfoxide,
bis(trichloromethyl)alpha-disulfone,
pentachlorophenyltrichloromethylsulfone,
pentachlorophenyltrichloromethylsulfoxide,
bis(trifluoromethyl)sulfone,
bis(trifluoromethyl)sulfoxide,
bis(dichlorofluoromethyl)sulfone,
bis(difluorochloromethyl)sulfone,
bis(dichlorofluoromethyl)sulfoxide,
bis(difluorochloromethyl)sulfoxide,
pentafluoroethyltrifluoromethylsulfone,
chloromethylene-bis(trichloromethyl sulfone),
chloromethylene-bis(tribromomethyl sulfone),
bromomethylene-bis(tribromomethyl sulfone,
bromoethylene-bis(trifluoromethyl sulfone),
trichloroethylene-bis(pentachloroethyl sulfone),
trichloroethylene-bis(tribromomethyl sulfone),
dichloromethylene-bis(trichloromethyl sulfone),
dibromomethylene-bis(trichloromethyl sulfone),
tetrachloroethylene-bis(trifluoromethyl sulfone), and
tetrachloroethylene-bis(pentabromoethyl sulfone).

Of the above compounds, the most useful are the bis (perhaloalkyl) sulfones, and more preferably the bis(perchloro $C_1$ to $C_3$ alkyl) sulfones such as bis(trichloromethyl) sulfone, i.e. $Cl_3CSO_2CCl_3$, sometimes called di(trichloromethyl) sulfone, and the chloro alkylene bis (perchloro alkyl sulfones), and more preferably the chloro $C_1$ to $C_3$ alkylene bis(perchloro $C_1$ to $C_3$ alkyl sulfones) such as chloromethylene-bis(trichloromethyl sulfone), i.e. $Cl_3CSO_2CHClSO_2CCl_3$, and dichloromethylene-bis (tri-chloromethyl sulfone), i.e.

$$Cl_3CSO_2CCl_2SO_2CCl_3$$

To produce the desired halo alkylene bis(perhalo alkyl sulfones), formaldehyde and mercaptoacetic acid are reacted at temperatures ranging from 20 to 50° C. to obtain methylene-bis(thioglycolic acid). The reaction product is then contacted with sodium hypochlorite or sodium hypobromite to simultaneously oxidize and halogenate the intermediate material to form the desired halo alkylene bis(perhalo alkyl sulfones).

The bromine derivative of the above-named compound is obtained when sodium hypobromite is utilized as the oxidation and halogenation agent. Fluorine derivatives are obtained by reacting a corresponding halogenated sulfide compound with antimony trifluoride in the presence of antimony pentafluoride at temperatures ranging from 25° to 95° C. for about 30 minutes. Fluorinated sulfones are then produced by oxidizing the compound using standard organic synthesis techniques. The preparation of bis(perhalo alkyl) sulfones is set forth in U.S. 2,628,982.

The initiator compounds of the present invention are used to form high yields of essentially gel-free polymers of $C_2$ to $C_8$ ethylenically unsaturated hydrocarbon olefins and other free-radical polymerizable monomers. Specifically, $C_2$ to $C_5$ alpha olefins such as ethylene, propylene, 1-butene, 1-pentene, and the like, can be polymerized with the initiators of the present invention. Dienes having from 4 to 8 carbon atoms such as 1,3-butadiene; 2-methyl-1,3-butadiene; 2,3-dimethyl-1,3-butadiene; 2-chloro-1,3-butadiene; cyclopentadiene; cyclohexadiene; and the like, can be polymerized with the initiators of the present invention. Examples of other free-radical polymerizable monomers that can be polymerized are $C_4$ to $C_8$, and more usually, $C_4$ to $C_6$ esters of unsaturated acids such as the methyl, and ethyl esters of acrylic, methacrylic and alpha chloroacrylic acids; $C_3$ to $C_6$ unsaturated nitriles such as acrylonitrile, methacrylonitrile, etc.; $C_2$ to $C_5$ unsaturated halides such as vinyl chloride, vinyl fluoride, vinylidene chloride, vinylidene fluoride, 1-chloro-1-fluoroethylene, chlorotrifluoroethylene, tetrafluoroethylene, tetrachloroethylene, sym-dichlorodifluoroethylene, etc.; vinyl esters of $C_1$–$C_{20}$ acids such as vinyl acetate, etc.; vinyl ethers, styrene, vinylpyridine, vinylbiphenyl, methyl vinyl ketone, ethyl fumarate, and other vinyl compounds; allyl and methallyl compounds such as allyl acetate, allyl alcohol, allyl chloride, allyl bromide, allyl fluoride, methallyl acetate, allyl amine, allyl melamines, allyl alcohols, etc. Other compounds that can be polymerized or copolymerized by means of the initiators of the present invention include: maleic esters, maleic anhydride, acrylamide, methacrylamide, diethylaminoacrylamide, diethylaminoethyl acrylate, sodium vinyl sulfonate, and $C_5$ to $C_8$ unsaturated silanes.

Polymerizations and copolymerizations utilizing the initiators of this invention can be carried out in solution, suspension, bulk, or in emulsion. Preferably, however, the polymerizations are conducted in the presence of water or an inert hydrocarbon diluent. Diluents, such as $C_5$ to $C_{12}$ aliphatic hydrocarbons, e.g. normal hexane, normal heptane, cyclohexane, and isooctane, aromatic and halogenated aromatic solvents such as benzene and chlorobenzene can be advantageously used in the present polymerization process. The monomer concentration in the diluent is not critical and generally concentrations of 0.1 to 300%, preferably 1 to 200% by weight, based upon the total reaction mixture, can be employed.

The polymerization initiators can be used in their solid or molten states or in solution and are added to the reaction system incrementally, continuously, or in its entirety initially. The concentration of polymerization initiator will be governed by the activity of the particular initiator, the monomer concentration, and the manner in which it is added. Initiator concentrations in the range of about 0.001 to 10 grams per 100 grams of monomer, with a preferred range of 0.01 to 5 grams per 100 grams of monomer, can be used.

The conditions at which the polymerization reaction is effected can vary over a wide range. Generally, temperatures ranging from 50 to 250° C. can be used; however, temperatures ranging from 100 to 200° C. are preferred. The polymerization reactions are carried out at pressures varying from atmospheric to superatmospheric. In general, pressures ranging from 1 to 10,000 atmospheres can be used; however, in most instances, pressures ranging from 50 to 1000 atmospheres are employed. The reaction times used will, in general, depend upon the activity of the polymerization initiator and the type of monomer employed. Reaction times ranging from 0.01 to 200 hours can be used, while in industrial application reaction times ranging from 0.5 to 30 hours will be more common.

The reaction vessel used for the polymerization reactions can be constructed of any material that is inert to the reactants and is capable of withstanding the operating pressures. Additionally, many polymerization reactions are exothermic and the reaction vessel should be of a size such that efficient heat transfer can be obtained. Reaction vessels made of supported glass, stainless steel, and glass-lined steel are quite satisfactory.

The polymers produced using the halogenated, sulfur-containing organic polymerization initiators of the present invention exist as viscous liquids or rubbery or crystalline solids and exhibit viscosity average molecular weights as determined by the modified Harris viscosity method of about 2000 to 65,000 and higher. The polymers produced generally contain a small amount of unsaturation and have iodine numbers (centigrams of iodine/gram of polymer) as determined by the modified Wijs method ranging from about 0.5 to 5.0 and higher. The melting point of the solid polymer products may be as high as 300° C.

The polymer products produced with the polymerization initiators of the present invention are substantially gel-free and have many varied uses. Polymers of hydrocarbon alpha olefins such as ethylene and propylene can be used as tank and pipe linings, pipes, wire and cable coatings, and are particularly applicable for use in the fabrication of molded articles. Copolymers of ethylene and vinyl acetate and ethylene and methyl acrylate contain small amounts of unsaturation and, as a result, can be loaded with filler such as carbon black and sulfur cured. The resulting vulcanizates find use in applications where high impact strength is required.

This invention and its advantages will be better understood by reference to the following examples:

*Example 1*

Several runs were made to demonstrate the effectiveness of the present polymerization initiators in the polymerization of ethylene. The runs were conducted utilizing a 3-liter high-pressure autoclave provided with a rocker-heater, valves, gauge, and blow-out patch. To the autoclave was charged the reaction diluent and the polymerization initiator. The autoclave was then flushed with nitrogen and then pressured with ethylene at room temperature. The autoclave was then sealed and rocked; heat was applied and the reactants brought to the desired reaction temperature. The reaction was continued for a specified time, after which time heating was discontinued and the reactor cooled to room temperature. The polymer product was then precipitated from solution by adding an equal volume of acetone. The conditions at which the tests were effected and the analyses of the polymer products obtained are set forth in Table I below:

TABLE I.—POLYMERIZATION OF ETHYLENE WITH DTCMS [a]

| Run No | 1 | 2 | 3 | 4 | 5 |
|---|---|---|---|---|---|
| Diluent [b] | n-Heptane | n-Heptane | Benzene | Benzene | Water |
| Volume, cc | 500 | 500 | 500 | 500 | 500 |
| Catalyst | DTCMS | DTCMS | DTCMS | DTCMS | DTCMS |
| Weight, g | 5 | 0.16 | 0.16 | 0.16 | 0.16 |
| Temperature, °C | 150-186 | 154-168 | 158-174 | 150-161 | 160 |
| $C_2$=Pressure, Max. (atm.) | (260) | (285) | (275) | (550) | 710 |
| Time, Hours | 2.7 | 30.2 | 29.5 | 45 | 48 |
| Polymer Weight [c] [i] | 42.9 | 34.9 | 8.7 | 113.2 | [d] 32.3 |
| Polymer Properties: | | | | | |
| Density,[e] g./cc | 0.98 | 0.87 | 0.93 | 0.90 | |
| Melting Point,[f] °C | 96 | 88 | 104 | 113 | 115 |
| ($\eta$) [g] | 0.33 | 0.06 | 0.48 | 0.85 | 0.75 |
| Chlorine Content,[h] Percent | 2.68 | 0.24 | 0.40 | 0.12 | |
| Sulfur Content,[h] Percent | 0.39 | 0.04 | 0.11 | 0.03 | |
| Iodine No | | | 2.3 | 0.9 | <0.5 |
| Percent Conversion | 13.2 | 5.8 | 4.2 | 11.2 | 3.5 |

[a] DTCMS denotes di(trichloromethyl) sulfone.
[b] n-Heptane-Phillips, 99% pure; benzene—Baker reagent grade.
[c] Polymer was precipitated with acetone and dried in a vacuum oven overnight at 50° C.
[d] In addition to 32.3 g. of solid polymer, 11.75 g. of the polymer remained in water as stable suspension which was inspected by an electron microscope and was found to contain spherical polymer particles of 0.1µ in size uniformly distributed. The concentration of the particles was found to be 2.5% (by evaporating 300 cc. of the suspension to yield 7.5 g. of polymer).
[e] Density was determined by displacement in methanol in a graduated cylinder.
[f] Melting point was determined by Fisher & Johns method.
[g] Intrinsic viscosity was determined in decalin at 135° C. at 1 gram per liter.
[h] Sulfur and chlorine were determined by Paar Bomb method.
[i] These products are soluble and gel-free in solvents for polyethylene such as xylene, decalin, chlorobenzene.

From the data set forth in Table I above, it can be seen that di(trichloromethyl)sulfone is a highly effective polymerization initiator for ethylene, as appreciable yields of polyethylene were obtained with its use. In runs 1 and 4, conversions exceeding 10% were obtained. In all cases, the products obtained were true polymers and no cross-linking or gelling was observed as evidenced by the fact that the products were soluble in conventional polyethylene solvents.

*Example 2*

Employing the apparatus of Example 1, several ethylene polymerization runs were carried out with the polymerization initiators of the present invention. It is well known that traces of oxygen can initiate the polymerization of ethylene. Tests were conducted to illustrate the polymerization activity of the initiators of the present invention in the relative absence of oxygen. The results of the tests and the conditions at which they were carried out are set forth in Table II below:

From the data presented in Table II above, it can be readily seen by comparing Runs 2 and 3 with Runs 1, 4, and 5 that under comparable levels of oxygen concentration the initiators of the present invention served to effect the formation of quantities of polymer far in excess of that obtained when no initiator was used. Runs 1 and 5 also indicate that percent conversions exceeding 10-15%, as experienced with the use of peroxide initiators, can be exceeded by use of the polymerization initiators of the present invention. Again, the products obtained were gel-free as they were completely soluble in typical polyethylene solvents.

*Example 3*

Employing the apparatus of Example 1, several tests were conducted to determine the effectiveness of the present initiators in the copolymerization of ethylene with vinyl acetate and methyl acrylate. The conditions at which the runs were carried out and the analyses of the polymers obtained are contained in Table III below:

TABLE II.—POLYMERIZATION OF ETHYLENE WITH TRICHLOROMETHYL SULFONES, AND THE EFFECT OF OXYGEN

| Run No | 1 | 2 | 4 | 4 | 5 |
|---|---|---|---|---|---|
| Materials Charged: [a] | | | | | |
| Benzene [b] | 500 | 500 | 500 | 500 | 500 |
| Catalyst, g | I, 0.15 | None | None | II, 0.16 | II, 1.6 |
| Ethylene, g | 790 | 870 | 341 | 341 | 356 |
| Oxygen Content, p.p.m | [c] | 13 | 18 | 14 | 15 |
| Polymerization Conditions: [d] | | | | | |
| Temperature, °C | 160-163 | 158-161 | 160-163 | 160 | 160 |
| Max. Total Press., (atm.) at Max. Temp. (°C.) | 558/160 | 655/161 | 400/161 | 305/160 | 340/160 |
| Polymerization Time, hrs | 24 | 24 | 12 | 12 | 12 |
| Product,[e] g | 211 | 24.8 | 5.1 | 21.5 | 100.3 |
| Melting Point, °C | 125 | | 115 | 108 | 100 |
| Density, g./cc | 0.925 | 0.919 | 0.920 | 0.917 | 0.929 |
| [$\eta$] [f] | 1.15 | 1.26 | 0.85 | 0.85 | 0.33 |
| Chlorine Content,[g] wt. Percent | 0.36 | | | 0.34 | 0.96 |
| Tensile at Yield p.s.i | 1,210 | 1,230 | 1,320 | 1,100 | 1,160 |
| Elongation at Yield, Percent | 150 | 180 | 140 | 50 | 50 |
| Percent Conversion [h] | 26.7 | 2.85 | 1.49 | 6.3 | 28.2 |

Catalyst I: Chloromethylene bis(trichloromethyl sulfone), $CCl_3.SO_2.CHCl.SO_2.CCl_3$.
Catalyst II: Di(trichloromethyl) sulfone, $CCl_3.SO_2.CCl_3$.
[a] The solvent and catalyst were charged into a glass-liner of a 3-liter stainless steel bomb. The bomb was evacuated with a vacuum pump to facilitate the removal of air and was refilled with nitrogen. This operation was repeated 15 times in order to bring the oxygen level of the bomb content to a minimum. Finally, some nitrogen (60 p.s.i.) was retained in the bomb, and ethylene was charged in and allowed to equilibrate for one hour before oxygen measurements were made.
[b] Benzene was percolated over a column of alumina (chromatographic grade) before use.
[c] In this run, the bomb was evacuated and refilled with nitrogen 5 times.
[d] The bomb was heated with continuous rocking. At the end of polymerization, the bomb was allowed to cool to room temperature before it was opened.
[e] The polymer was precipitated with acetone.
[f] Intrinsic viscosity determined in decalin at 0.905 g./liter at 135° C.
[g] Determined by Dietert method.
[h] Products are completely soluble in typical polyethylene solvents such as xylene, decalin, chlorobenzene.

TABLE III

| Run No. | 1 | 2 | 3 |
|---|---|---|---|
| Materials Charged: [a] | | | |
| Benzene, cc. | 400 | 400 | 400. |
| Monomer, cc. (grams) | I, 1,100 (93.2) [b] | I, 1,100 (93.2) [b] | II, 100 (97.4). |
| Catalyst, $CCl_3.SO_2.CCl_3$, grams | 0.16 | 0.16 | 0.16. |
| Ethylene, grams | 822 | 401 | 860. |
| Nitrogen, p.s.i. | 60 | 1000 | 60. |
| Polymerization Conditions: [c] | | | |
| Temperature, °C. | 160–162 | 160–164 | 160–180. |
| Max. Total Press. (atm.) at Max. Temp. (°C.) | 600/160 | 285/164 | 690/170. |
| Polymerization Time, hrs. | 48 | 98 | 53. |
| Product, grams | 140.7 [d] | 7.0 [e] | 183.7. |
| Physical State | Elastic Solid | Sticky Grease | Gummy Solid. |
| Analysis: | | | |
| C, H, Oxygen, percent | 79.77, 12.89, 7.95 | 68.97, 10.16, 22.0 | 71.2, 11.0, 17.2. |
| Molecular Weight [f] | | 3,804 | |
| Melting Point, °C | 85 to 90 | | |
| Density, grams/cc | 0.940 | | 1.012. |
| $[\eta]$ [g] | 0.54 | | |
| Composition—Ethylene, wt. percent | 79 | 41.4 | 11.5. |
| Monomer, wt. percent | 21 | 58.6 | 88.5. |
| Properties: | | | |
| Tensile at Yield, p.s.i. [h] | 1,150 | | |
| Elongation at Yield, percent | 1,440 | | |

I—Vinyl Acetate. II—Methyl Acrylate.

[a] Benzene, monomer, and the catalyst was charged into a glass liner of a 3-liter stainless steel bomb. The bomb was purged with nitrogen to exclude air and was filled with nitrogen at the end of purging and was finally charged with ethylene gas.
[b] Vinyl acetate was washed with 0.5 N KOH followed by water-washing until neutrality.
[c] The bomb was heated with continuous rocking. At the end of polymerization, the bomb was allowed to cool to room temperature before it was opened.
[d] The copolymer was isolated by precipitation with methanol. The solid was redissolved in hot toluene and precipitated with acetone and dried in a vacuum oven at 66° C.
[e] The reacted liquid was distilled to yield 13.2 g. of viscous residue, which was dissolved in acetone and precipitated with methanol and dried in a vacuum oven at 70° C.
[f] Cryoscopic method in benzene.
[g] Determined in decalin at 0.905 g. per liter at 125° C.
[h] Tested on micropads with a small Instron at 2 inches per minute. The pads were prepared by pressing a sample at 320° F. for 2 minutes.

An analysis of the data presented in Table III above indicates that solid polymers of ethylene and vinyl acetate, and ethylene and methyl acrylate can be produced with the initiators of the present invention when the polymerization is conducted at relatively high pressures. The copolymers obtained were substantially free of cross-linked material. It is especially interesting to note that the solid copolymer of ethylene and vinyl acetate contains a sufficient amount of residual unsaturation to render the copolymer curable with conventional vulcanizing agents. The above copolymer (100 parts by weight) when compounded with 50 parts by weight of carbon black and 5 parts by weight of a vulcanizing agent and subsequently press-cured for 60 minutes at 320° F. yielded tensile strengths ranging from 2200 to 2600 p.s.i.

*Example 4*

Into the apparatus of Example 1 was charged 500 mls. of benzene that was percolated over a column of alumina before use, 0.16 grams of bis(trichloromethyl)-sulfone and 200 mls. of liquefied propylene that was scrubbed through dilute triethyl aluminum. The autoclave was then pressured with ethylene and the temperature raised to 158° C., at which point the internal bomb pressure was 8000 p.s.i.g. The autoclave was maintained at a temperature in the range between 158 and 162° C. with continuous rocking for a period of 40 hours. At the end of the polymerization, the bomb was allowed to cool to room temperature before it was opened. The polymer product was then precipitated from the reaction mixture with acetone and dried in a vacuum oven. A yield of 44.3 grams of snowy-white solid was obtained. By infrared determinations, the polymer was found to contain about 8% propylene and 92% ethylene. The polymer product had a density of 0.743, an intrinsic viscosity, as measured in decalin at 135° C., of 0.33, and a Fisher-Johns melting point of 71° C. The above experiment indicates that ethylene and higher molecular weight alpha olefins can be polymerized with the initiators of the present invention to obtain desirable yields of solid copolymer.

*Example 5*

Several runs were conducted to determine the effect of the present polymerization initiators on the polymerization of free radical polymerizable monomers. In the tests, methyl methacrylate and styrene were polymerized in the presence and absence of the polymerization initiators of the present invention. In each run, the polymerization was effected in a glass reactor equipped with a reflux condenser. The mixture of monomer and solvent was refluxed at the reaction temperature for a specified period of time. Following the completion of the reaction, the polymer was precipitated from the reaction mixture with a lower alkanol and the polymer was stripped of solvents in a vacuum oven. The conditions at which the runs were conducted and a description of the polymer obtained are set forth in Table IV below:

TABLE IV

| Run No. | 1 | 2 | 3 | 4 |
|---|---|---|---|---|
| Reactants and Conditions: | | | | |
| Monomer, g. (ml.) | [a] 69 | [a] 69 | [b] (50) | [b] (50) |
| Solvent (ml.) | | | [c] 200 | [c] 200 |
| Bis(trichloromethyl)Sulfone | 0.7 | None | None | 0.225 |
| Temperatur, °C. | 95 | 91 | 130–131 | 130–131 |
| Reaction Time, hours | 1¾ | 1¾ | 2¼ | 2¼ |
| Product and Analysis: | | | | |
| Polymer | Solid | Solid | Solid | Solid |
| Polymer, g | 10.02 | 1.48 | 5.75 | 19.92 |
| $[\eta]$ in Butanone at 25° C | 0.95 | 2.50 | | |
| $[\eta]$ in Benzene at 25° C | | | 0.695 | 0.288 |

[a] Methyl Methacrylate. [b] Styrene. [c] Chlorobenzene.

The data indicate that about 4 to 5 times more soluble solid polymers is obtained with the use of bis(trichloromethyl)sulfone than is obtained when the polymerization reaction is conducted in the absence of the sulfone.

*Example 6*

The polymerization activity of various types of alkyl sulfone and alkyl sulfoxide compounds was studied by adding 0.1 gram of the same to 25 mls. of refluxing acrylonitrile and then observing the rapidity with which a polymer is formed. Alkyl sulfone and sulfoxide compounds, containing more than one unsubstituted hydrogen atom per molecule, such as dimethyl sulfone, bis-(dichloromethyl)sulfone, and dimethylsulfoxide did not serve to initiate polymerization upon heating for an extended period. Perchloromethyl mercaptan, a compound that does not contain an oxygenated sulfur group, also did not have any polymerization activity. In contrast, compounds such as bis(trichloromethyl)sulfone and bis-(tribromomethyl)sulfoxide served to initiate the polymerization of acrylonitrile within a few minutes after their addition.

Example 7

Essentially halogen substituted polymeric materials having from 3 to 11 perhalogenated lower alkyl sulfone groups per macromolecule are prepared by the following process. Into a glass reaction vessel equipped with stirrer, reflux condenser, and gas inlet and outlet tubes is charged 5 grams of finely divided sodium in 900 grams of normal heptane and 100 grams of dioxane. The reaction vessel and its contents is heated to a temperature of about 176° F. and 120 grams of gaseous butadiene is added continuously to the reaction zone. Heating is continued until the polymerization reaction is substantially complete. Following completion of the reaction, sufficient acetic acid is added to the reaction zone to convert unreacted sodium to sodium acetate. The reaction liquid is then washed with water to remove the sodium acetate and the resulting liquid is stripped under a nitrogen atmosphere until the heptane and dioxane is removed. About 120 grams of a light colored liquid polybutadiene having a molecular weight of about 600 as determined by an ebulloscopic method is obtained as a residue. The iodine member of the polybutadiene is about 420 as determined by the WIJS method.

One hundred grams of the above polymer is then dissolved in 500 cc. of a solvent consisting of 75 volume percent benzene and 25 volume percent isopropyl alcohol. A solution consisting of 0.5 gram of benzoyl peroxide in 10 cc. of benzene is then added to the polymer solution. The reaction vessel is then blanketed with nitrogen and 340 grams of mercaptoacetic acid is added to the reaction zone and the mixture refluxed for 24 hours. Following completion of the reaction period, the solvent and excess mercaptoacetic acid are stripped from the polybutadienemercaptoacetic acid adduct by heating under a vacuum of 10 mm. of mercury. Sulfur analysis of the above product indicates that there are nine

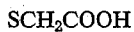

groups per mole of adduct.

One hundred grams of the above adduct are added to a sufficient quantity of one normal sodium hydroxide to dissolve the adduct. A solution consisting of 740 grams of sodium hypochlorite and 90 grams of sodium bicarbonate dissolved in 6 liters of water is then added to the adduct solution at such a rate that the reaction temperature does not exceed about 113° F. The reaction product separates from the water phase during reaction and is collected by decantation and is subsequently dissolved in carbon tetrachloride. To the carbon tetrachloride solution is then added 700 grams of sulfuric oxychloride. The mixture is then refluxed until the evolution of hydrogen chloride and sulfur dioxide has essentially ceased. The final product is recovered by distilling off the carbon tetrachloride and residual sulfuric oxychloride. Product yield is essentially quantitative. Sulfur and chlorine analysis indicate that the product is of essentially the following composition: $C_{44}H_{11}Cl_{68}(SO_2CCl_3)_9$. The product is suitable for use as an initiator in the polymerization of ethylenically unsaturated monomers. This example is merely illustrative of the types of polymeric sulfone adducts which may be formed and forms no part of this invention.

The advantages of this invention will be apparent to those skilled in the art. Novel polymerization initiators are made available for use in the preparation of a wide variety of products. It is to be understood that this invention is not limited to the specific examples set forth herein, which have been offered merely as illustrations, and that modifications may be made without departing from the spirit and scope of the appended claims.

What is claimed is:

1. A method for making polymers which comprises polymerizing at least one monomer containing ethylenic unsaturation with an initiating compound selected from the group consisting of:

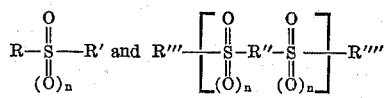

where $n$ is 0 or 1; R, R', R''' and R'''' are perhalogenated hydrocarbon or perhalogenated oxyhydrocarbon groups containing 1 to 20 carbon atoms and R'' is selected from the group consisting of a halogenated hydrocarbon containing 1 to 20 carbon atoms and not more than 1 hydrogen atom.

2. The process of claim 1, wherein the initiating compound is a bis(perhalo alkyl)sulfone.

3. The process of claim 1, wherein the initiating compound is a halo alkylene bis(perhalo alkyl sulfone).

4. A method for making polymers which comprises polymerizing at least one monomer containing ethylenic unsaturation with an intiating compound selected from the group consisting of bis(perhalo $C_1$ to $C_3$ alkyl) sulfones and perhalo $C_1$ to $C_3$ alkylene bis(perhalo alkyl sulfones).

5. The process of claim 4, wherein the initiating compound is bis(perchloro $C_1$ to $C_3$ alkyl) sulfone.

6. The process of claim 4, wherein the initiating compound is a perchloro $C_1$ to $C_3$ alkylene bis(perchloroalkylsufone).

7. A method for making polymers which comprises polymerizing at least one $C_2$ to $C_8$ monomer containing ethylenic unsaturation with an initiating compound selected from the group consisting of:

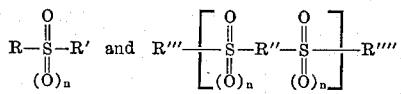

where $n$ is 0 or 1; R, R', R''' and R'''' are perhalogenated hydrocarbon or perhalogenated oxyhydrocarbon groups containing 1 to 20 carbon atoms and R'' is selected from the group consisting of a halogenated hydrocarbon containing 1 to 20 carbon atoms and not more than 1 hydrogen atom, said polymerization being conducted at elevated pressures.

8. The process of claim 7, wherein the polymerization is conducted at a pressure ranging from about 1 to 10,000 atmospheres.

9. The process of claim 7, wherein the polymerization is conducted at a temperature in the range of from about 50 to 250° C. and a pressure ranging from 50 to 1000 atmospheres.

10. The process of claim 7, wherein the concentration of initiator in the polymerization zone varies in the range of about 0.01 to 5 parts of initiator per 100 parts of monomer.

11. The process of claim 7, wherein the monomer is ethylene.

12. The process of claim 7, wherein the monomers are ethylene and propylene.

13. The process of claim 7, wherein the monomers are ethylene and vinyl acetate.

14. The process of claim 7, wherein the initiating compound is di(trichloromethyl)sulfone.

15. The process of claim 7, wherein the initiating compound is chloromethylene-bis(trichloromethyl sulfone).

16. The process of claim 7, wherein the initiating compound is bis(tribromomethyl)sulfoxide.

17. A method for polymerizing ethylene which comprises contacting ethylene in a reaction zone with chloromethylene bis(trichloromethyl sulfone) at a temperature ranging from 100 to 200° C. and a pressure ranging from 50 to 1000 atmospheres, the concentration of said chloromethylene bis(trichloromethyl sulfone) in said reaction zone being in the range of about 0.01 to 5 parts per 100 parts of ethylene.

18. The method of claim 17, wherein a polyethylene product is recovered that is substantially free of gel.

19. The process of claim 1 wherein the initiating compound is bis(trichloromethyl)sulfone.

20. The process of claim 7 wherein the initiating compound is bis(trichloromethyl)sulfone.

References Cited

UNITED STATES PATENTS

| | | | |
|---|---|---|---|
| 2,391,218 | 12/1945 | Bacon et al. | 260—94.9 |
| 2,628,982 | 2/1953 | James | 260—607 |
| 2,706,719 | 4/1955 | Newberg et al. | 260—94.9 |
| 2,900,360 | 8/1959 | Schmitz-Josten | 260—607 |
| 3,051,757 | 8/1962 | Johnston | 260—607 |
| 3,249,595 | 5/1966 | Lederer et al. | 260—94.9 |

JOSEPH L. SCHOFER, *Primary Examiner.*

M. KURTZMAN, *Assistant Examiner.*